United States Patent
Taka et al.

(10) Patent No.: US 10,100,921 B2
(45) Date of Patent: Oct. 16, 2018

(54) VEHICLE SHIFT CONTROLLER

(71) Applicant: HONDA MOTOR CO., LTD., Tokyo (JP)

(72) Inventors: Shohei Taka, Wako (JP); Yoshiharu Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 566 days.

(21) Appl. No.: 14/838,961

(22) Filed: Aug. 28, 2015

(65) Prior Publication Data

US 2016/0076638 A1    Mar. 17, 2016

(30) Foreign Application Priority Data

Sep. 16, 2014    (JP) .................................. 2014-187302

(51) Int. Cl.
  *F16H 59/20*    (2006.01)
  *F16H 61/02*    (2006.01)
  *F16H 61/00*    (2006.01)

(52) U.S. Cl.
  CPC .......... *F16H 59/20* (2013.01); *F16H 61/0213* (2013.01); *F16H 2061/0087* (2013.01); *F16H 2061/0244* (2013.01)

(58) Field of Classification Search
  CPC ................. F16H 59/20; F16H 61/0213; F16H 2061/0244; F16H 2061/0087
  See application file for complete search history.

(56) References Cited

U.S. PATENT DOCUMENTS

| 8,401,759 | B2 | 3/2013 | Shiomi et al. |
| 8,670,913 | B2 | 3/2014 | Sakaguchi et al. |
| 9,176,515 | B2 | 11/2015 | Maruyama et al. |
| 9,376,016 | B2 | 6/2016 | Lahm |

(Continued)

FOREIGN PATENT DOCUMENTS

| CN | 102762404 A | 10/2012 |
| CN | 103635344 A | 3/2014 |

(Continued)

OTHER PUBLICATIONS

Office Action dated Jul. 21, 2017, issued in counterpart Chinese Application No. 201510501024.X, with English translation. (9 pages).

*Primary Examiner* — Huan Le
(74) *Attorney, Agent, or Firm* — Westerman, Hattori, Daniels & Adrian, LLP

(57) ABSTRACT

A stay time integrating device integrates stay time of an accelerator pedal in each pedal stroke position within a predetermined stroke range including a click position. A click stroke calculating device calculates a click stroke based on a pedal stroke position where stay time calculated by the integrating device is the shortest. Thus, it is possible to correctly calculate the click stroke with which the accelerator pedal is actually depressed beyond the click position. In accordance with the click stroke, a control stroke calculating device updates a relationship of the control stroke with a pedal stroke. Accordingly, even if the click stroke varies from one vehicle to another, kick-down which a driver intends can be performed in synchronism with depression of the accelerator pedal beyond the click position by compensating for the variation.

4 Claims, 6 Drawing Sheets

(56) References Cited

U.S. PATENT DOCUMENTS

| | | | |
|---|---|---|---|
| 2003/0019278 A1* | 1/2003 | Kato | F02D 11/105 |
| | | | 73/1.75 |
| 2004/0200309 A1* | 10/2004 | Hasegawa | B60K 26/021 |
| | | | 74/513 |
| 2010/0299037 A1 | 11/2010 | Sakaguchi et al. | |
| 2014/0109717 A1* | 4/2014 | Maruyama | B60K 26/021 |
| | | | 74/513 |
| 2014/0214288 A1* | 7/2014 | Tokura | F16H 61/0213 |
| | | | 701/52 |

FOREIGN PATENT DOCUMENTS

| | | |
|---|---|---|
| CN | 103661404 A | 3/2014 |
| JP | H06-129521 A | 5/1994 |
| JP | H07-150987 A | 6/1995 |
| JP | 2006-176001 A | 7/2006 |
| JP | 2009-2440 A | 1/2009 |
| JP | 2013-014259 A | 1/2013 |
| JP | 2013-181410 A | 9/2013 |
| WO | 2010/013125 A1 | 2/2010 |

* cited by examiner

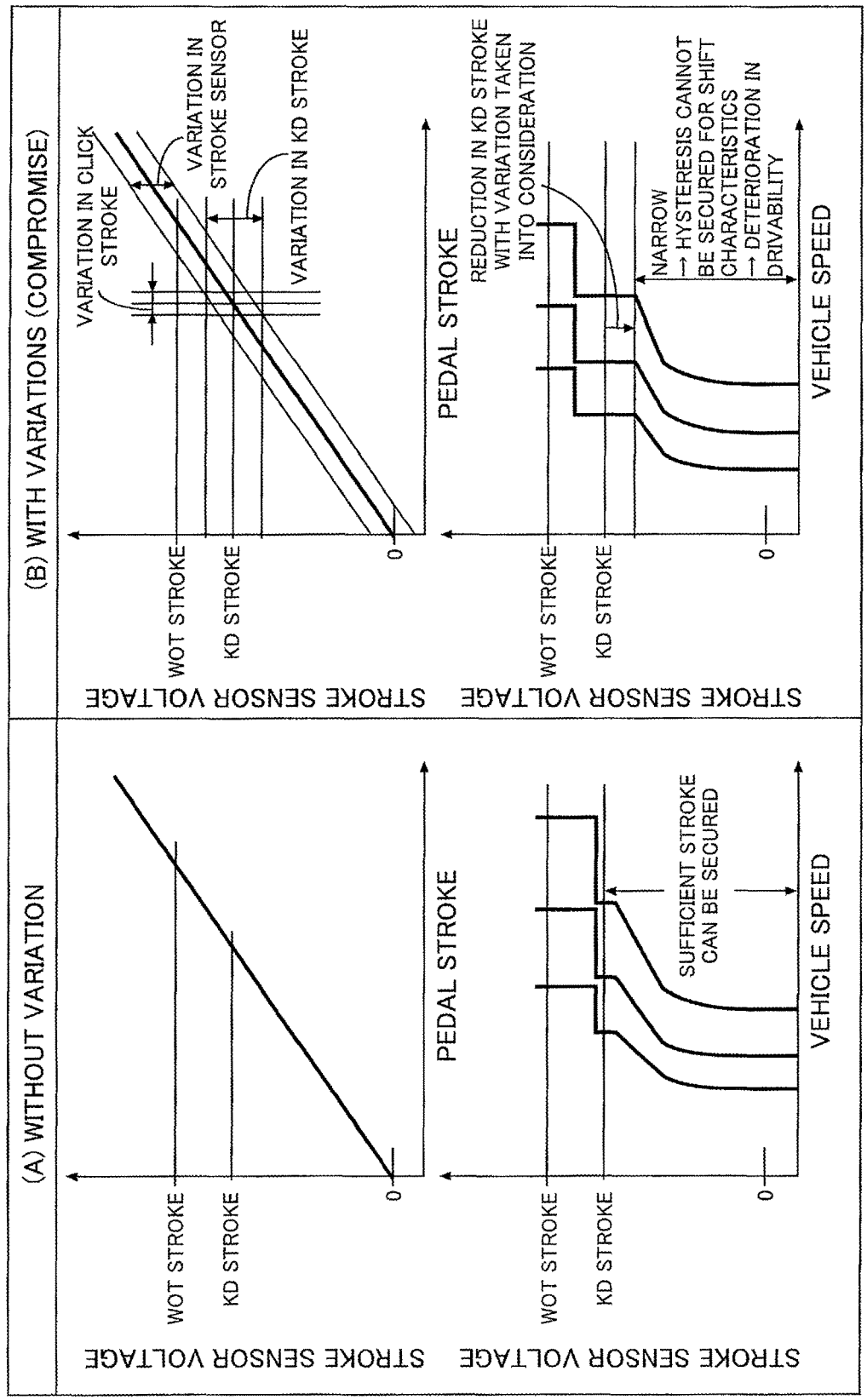

VEHICLE SHIFT CONTROLLER

FIELD OF THE INVENTION

The present invention relates to a vehicle shift controller comprising: an accelerator pedal which a driver operates by depression; a click mechanism for giving a click feeling to pedal reaction force at a click position in a middle of a stroke of the accelerator pedal; pedal stroke detecting means for detecting a pedal stroke of the accelerator pedal; control stroke calculating means for calculating a control stroke based on the pedal stroke; and shift controlling means for performing kick-down of an automatic transmission when the control stroke exceeds a pre-set kick-down stroke.

BACKGROUND OF THE INVENTION

In a vehicle including an automatic transmission, when a driver suddenly depresses an accelerator pedal, downshift (kick-down) of the automatic transmission to a lower-speed side shift stage is automatically performed, and the vehicle thereby can obtain higher acceleration performance. Japanese Patent Application Laid-open No. 2006-176001 has made publicly known a pedal reaction force control device which includes a click mechanism for giving a click feeling by sharply increasing pedal reaction force at a predetermined stroke position where the accelerator pedal is depressed, and sharply decreasing the pedal reaction force when the accelerator pedal is depressed beyond the position, for the purpose of making the driver feel whether or not the accelerator pedal is depressed to a position where the kick-down is started.

In the conventional practice, the pedal reaction force control device including such a click mechanism is configured such that: as shown in Part (A) of FIG. 5, a stroke sensor converts a pedal stroke of the accelerator pedal into a voltage; when the voltage exceeds a predetermined voltage, it is judged that the accelerator pedal is depressed beyond the click position; and the kick-down of the automatic transmission is performed. However, in a case where as shown in Part (B) of FIG. 5, variation in mechanical precision of the click mechanism makes the click position of the accelerator petal different from one vehicle to another, and makes output voltage from the stroke sensor vary when the accelerator pedal is depressed beyond the click position, there is likelihood that: even though the accelerator pedal is depressed beyond the click position, the kick-down is not performed immediately; or before the accelerator pedal is depressed beyond the click position, the kick-down is carried out.

For example, even if the accelerator pedal is designed to be depressed beyond the click position when reaching a 70% stroke position, there is a case where variation in the click mechanism allows the accelerator pedal to be depressed beyond the click position when the accelerator pedal reaches a 80% stroke position. In this case, the output voltage from the stroke sensor reaches the predetermined voltage when the accelerator pedal reaches the 70% stroke position which is prior to the position where the accelerator pedal is depressed beyond the click position. As a result, there is likelihood that the kick-down which the driver does not expect is carried out.

On the other hand, in a case where the variation in the click mechanism allows the accelerator pedal to be depressed beyond the click position when the accelerator pedal reaches a 60% stroke position, there is a time lag between depression of the accelerator pedal beyond the click position at the 60% stroke position and arrival of the output voltage of the stroke sensor to the predetermined voltage at the 70% stroke position. As a result, there is likelihood that the kick-down is carried out later than the driver expects.

Particularly, if the kick-down is carried out before the accelerator pedal is depressed beyond the click position, the driver is given a significantly abnormal feeling. For this reason, the kick-down is prevented from being carried out before the accelerator pedal is depressed beyond the click position by setting a kick-down stroke, which is conventionally set as shown in a shift map in Part (A) of FIG. 6, to be lower as shown in a shift map in Part (B) of FIG. 6 with a possible error in the click position (a resultant possible error in the output from the stroke sensor) taken into consideration.

However, lower setting of the kick-down stroke makes vertical widths of shift lines in the shift map shown in Part (B) of FIG. 6 become narrower so as to make it difficult to sufficiently secure hysteresis for an upshift and a downshift. As a result, there is likelihood that drivability deteriorates.

Even if the click position of the click mechanism is accurate, such problems similarly occur in a case where there is variation in the output from the stroke sensor for converting the stroke of the accelerator pedal into the voltage. For this reason, control needs to be done to ensure that, by compensating for the variation in the precision of the click mechanism, the kick-down is carried out at a moment when the accelerator pedal is depressed beyond the click position.

SUMMARY OF THE INVENTION

The present invention has been made with the foregoing situations taken into consideration. One object of the present invention is to enable kick-down to be securely carried out by compensating for variation in precision of a click mechanism of an accelerator pedal.

In order to achieve this object, according to a first aspect of the present invention, there is provided a vehicle shift controller comprising: an accelerator pedal which a driver operates by depression; a click mechanism for giving a click feeling to pedal reaction force at a click position in a middle of a stroke of the accelerator pedal; pedal stroke detecting means for detecting a pedal stroke of the accelerator pedal; control stroke calculating means for calculating a control stroke based on the pedal stroke; and shift controlling means for performing kick-down of an automatic transmission when the control stroke exceeds a pre-set kick-down stroke, wherein the shift controller further comprises: stay time integrating means for integrating stay time of the accelerator pedal in each pedal stroke position within a predetermined stroke range including the click position; and click stroke calculating means for calculating a click stroke based on a pedal stroke position where stay time integrated by the stay time integrating means is the shortest, wherein the control stroke calculating means updates a relationship of the control stroke with the pedal stroke in accordance with the click stroke.

According to the first aspect, when the driver depresses the accelerator pedal beyond the click position, the control stroke calculated from the pedal stroke exceeds the pre-set kick-down stroke. Thereby, the kick-down of the automatic transmission is performed, and acceleration performance of a vehicle is enhanced.

The stay time integrating means integrates the stay time of the accelerator pedal in each pedal stroke position within the predetermined stroke range including the click position, and the click stroke calculating means calculates the click stroke on the basis of the pedal stroke position where the stay time integrated by the stay time integrating means is the shortest. Therefore, even if there is variation in the click position of the accelerator pedal, it is possible to correctly calculate the click stroke with which the accelerator pedal is actually depressed beyond the click position.

In accordance with the click stroke, the control stroke calculating means updates the relationship of the control stroke with the pedal stroke. For this reason, even if the click stroke varies from one vehicle to another, the kick-down which the driver intends can be performed in synchronism with the depression of the accelerator pedal beyond the click position, by compensating for the variation.

Furthermore, the kick-down stroke need not be set lower for the purpose of preventing unexpected kick-down from being performed. For this reason, it is possible to fully secure hysteresis for an upshift and a downshift by widening intervals between shift lines in a shift map, and accordingly to avoid deterioration in drivability. Moreover, since the click stroke can be calculated by only operating the accelerator pedal by depression without actually making the vehicle travel, convenience is enhanced.

According to a second aspect of the present invention, in addition to the first aspect, when a deviation between a pre-set reference click stroke and the click stroke exceeds a threshold value, the click stroke calculating means updates the reference click stroke with the click stroke.

According to the second aspect, when the deviation between the pre-set reference click stroke and the click stroke exceeds the threshold value, the click stroke calculating means updates the reference click stroke with the click stroke. For this reason, it is possible to avoid frequent updates.

According to a third aspect of the present invention, in addition to the first or second aspect, the control stroke calculating means calculates a gain from a relationship between the click stroke and the kick-down stroke, and calculates the control stroke by multiplying the pedal stroke by the gain.

According to the third aspect, the control stroke calculating means calculates the gain from the relationship between the click stroke and the kick-down stroke, and calculates the control stroke by multiplying the pedal stroke by the gain. For this reason, the control stroke can be calculated simply and accurately.

Note that a stroke sensor 14 of an embodiment corresponds to the pedal stroke detecting means of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

The present invention will be described with reference to the accompanying drawings, wherein:

FIG. 6 is an explanatory view of problems with the conventional vehicle shift controller (Part 2).

DESCRIPTIONS OF THE PREFERRED EMBODIMENT

Descriptions will be hereinbelow provided for an embodiment of the present invention on the basis of FIGS. 1 to 4.

Figure 1:
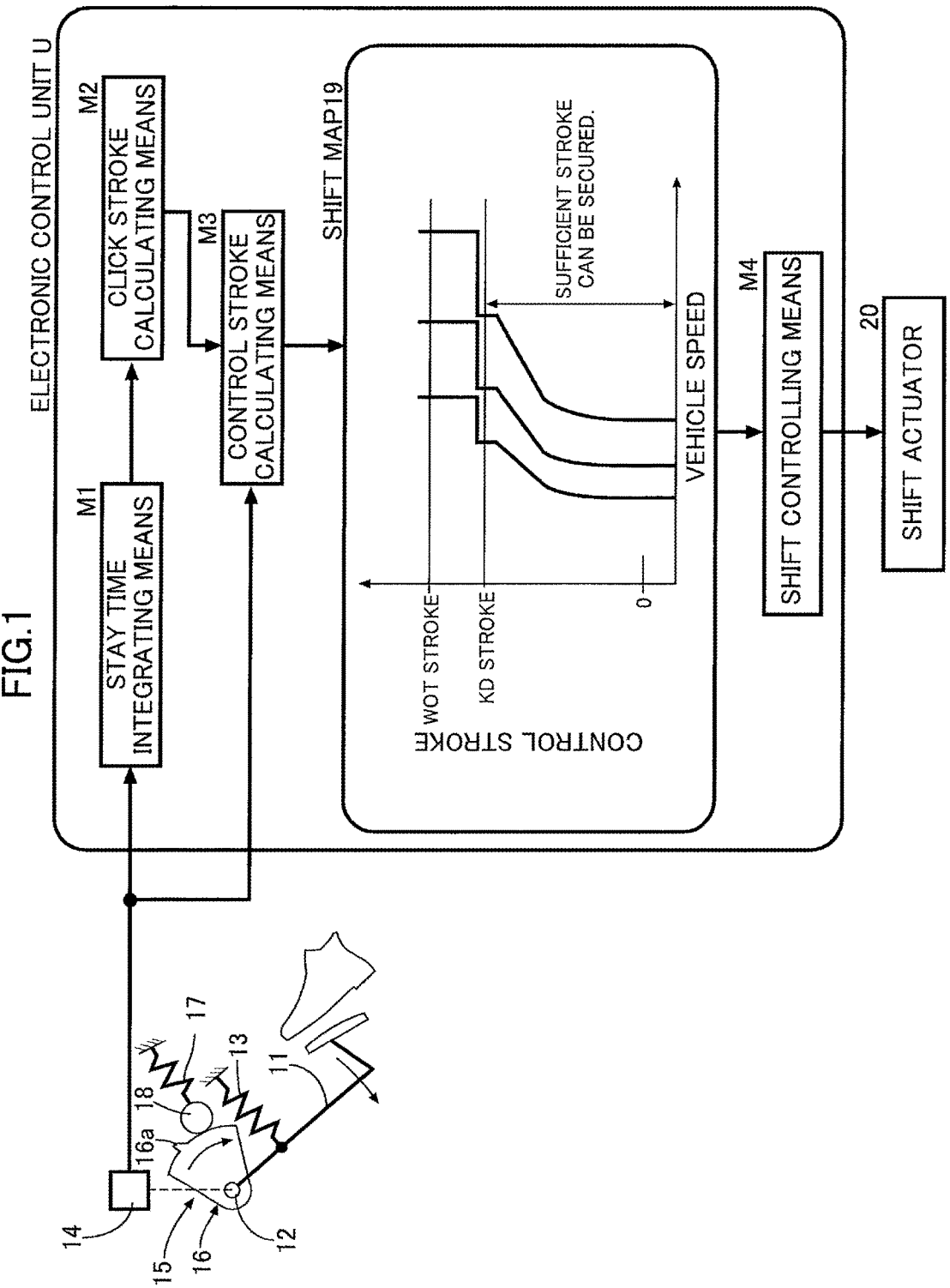
FIG. 1 is a diagram showing a configuration of a vehicle shift controller.

As shown in FIG. 1, an accelerator pedal 11 which the driver operates by depressing the accelerator pedal 11 by a foot is pivotably supported on a vehicle body using a spindle 12, and is biased toward its initial position by a return spring 13. A stroke of the accelerator pedal 11 is detected by a stroke sensor 14 connected to the spindle 12. The stroke sensor 14 detects the stroke of the accelerator pedal 11 on the basis of an angle of rotation of the spindle 12. The stroke is converted into a voltage signal, which is outputted to an electronic control unit U.

The accelerator pedal 11 is provided with a click mechanism 15 for giving a click feeling to pedal reaction force in a process of a depressing operation of the accelerator pedal 11. The click mechanism 15 includes: a fan-shaped cam plate 16 fixed to the spindle 12; and a roller 18 biased by a spring 17 so as to be capable of abutting against an outer periphery of the cam plate 16. A protrusion 16a is projectingly provided to the outer periphery of the cam plate 16. Thus, when the cam plate 16 rotates as a result of depressing the accelerator pedal 11 from its initial position against elastic force of the return spring 13, the roller 18 eventually abuts against the protrusion 16a of the cam plate 16, and the pedal reaction force thereby increases sharply. Subsequently, when the protrusion 16a climbs over the roller 18 while compressing the spring 17, the pedal reaction force decreases sharply. Accordingly, when strongly depressing the accelerator pedal 11 in order to suddenly accelerate the vehicle by performing kick-down of an automatic transmission, the driver can obtain the click feeling which is produced by a sudden change in the pedal reaction force when the protrusion 16a climbs over the roller 18.

The electronic control unit U includes: stay time integrating means M1; click stroke calculating means M2; control stroke calculating means M3; shift controlling means M4; and a shift map 19 in which parameters are a vehicle speed and an accelerator pedal opening degree (a control stroke). The stroke sensor 14 for detecting the pedal stroke of the accelerator pedal 11 is connected to the stay time integrating means M1 and the control stroke calculating means M3, while the shift controlling means M4 is connected to a shift actuator 20 for shifting the automatic transmission.

Figure 2:
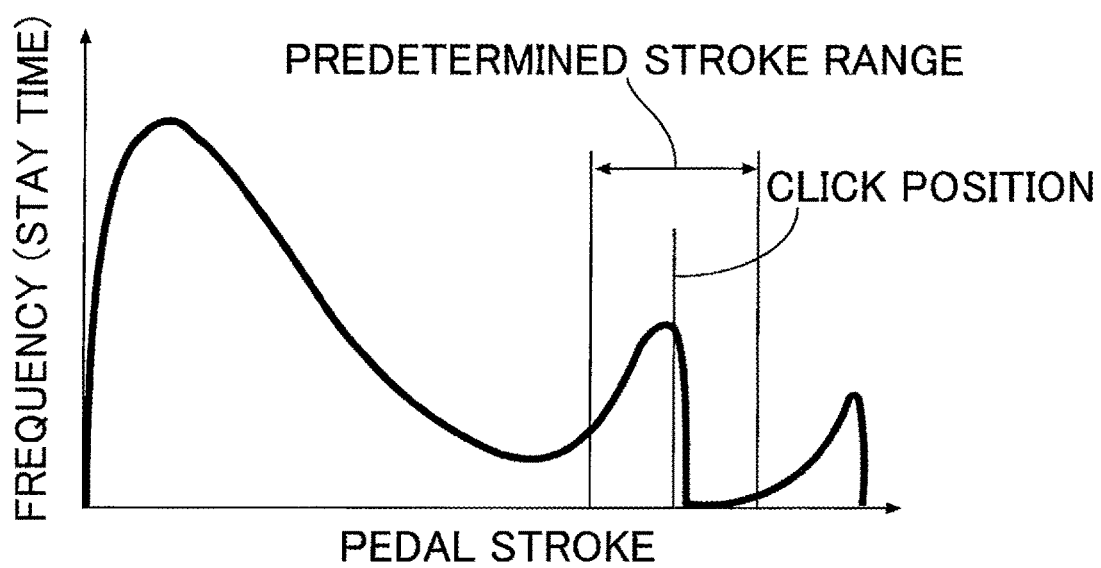
FIG. 2 is an explanatory view of a method for calculating a click position of an accelerator pedal.

In the pedal stroke of the accelerator pedal 11 detected by the stroke sensor 14 during driving of the vehicle, for example, within a predetermined stroke range including a click position present at a 70% stroke position (for example, within a range of a 60% stroke position to an 80% stroke position), the stay time integrating means M1 integrates stay time of the accelerator pedal 11 in each pedal stroke position. Stay time in each pedal stroke position corresponds to a frequency at which the accelerator pedal 11 stays in the corresponding pedal stroke position. As shown in FIG. 2, in the range of the 60% stroke position to the 80% stroke position, which includes the click position, stay time in a pedal stroke position immediately before the click position is the largest, while stay time in a pedal stroke position immediately after the click position is the shortest.

This is because: in many cases, the accelerator pedal 11 stops immediately before the click position where the pedal reaction force becomes the largest; and when the accelerator pedal 11 is depressed beyond the click position as a result of suddenly operating the accelerator pedal 11 in order to perform the kick-down of the automatic transmission, the accelerator pedal 11 instantaneously passes over the pedal stroke position immediately after the click position.

As described above, when the stay time integrating means M1 integrates stay time in each pedal stroke position within the range of the 60% stroke position to the 80% stroke position, which includes the click position, the click stroke calculating means M2 calculates, as an actual click position in consideration of variation in the click mechanism 15 of the vehicle, a position by a predetermined stroke before a pedal stroke position where the stay time becomes the shortest.

Figure 3:
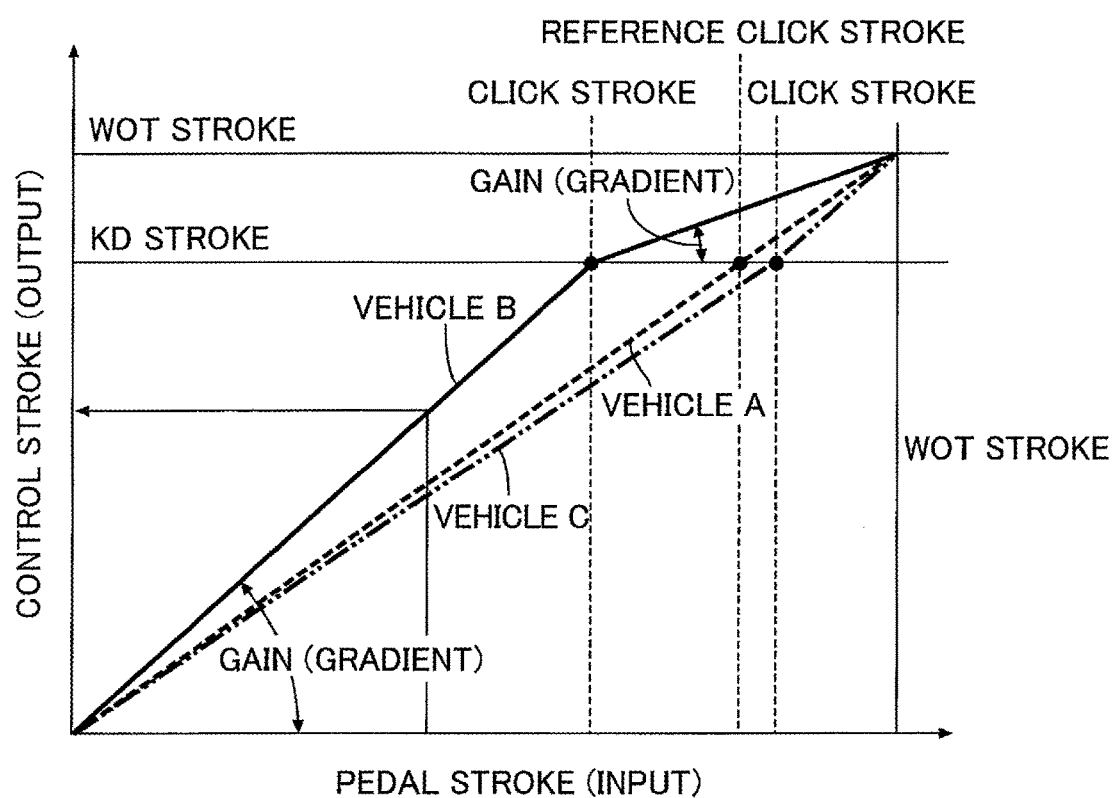
FIG. 3 is an explanatory view of an operation of control stroke calculating means.

On the basis of a map shown in FIG. 3, the control stroke calculating means M3 converts the pedal stroke of the accelerator pedal 11 into a control stroke. In the map in FIG. 3, a horizontal axis represents the pedal stroke detected by the stroke sensor, while a vertical axis represents the control stroke. A kick-down stroke in the vertical axis represents a threshold value at which the kick-down of the automatic transmission is performed when the control stroke exceeds the kick-down stroke. The largest stroke in the vertical axis represents a stroke at which a throttle opening degree is the largest (a WOT stroke).

A vehicle A represents a vehicle in which the click position of the accelerator pedal 11 correctly coincides with a design reference click position. Until the pedal stroke reaches the WOT stroke from a zero position via the click stroke, the control stroke linearly increases in proportion with the increase in the pedal stroke from zero to the WOT stroke via the kick-down stroke. When the pedal stroke becomes equal to the click stroke (the reference click stroke in the case of the vehicle A), the control stroke becomes equal to the kick-down stroke.

A vehicle B represents a vehicle in which the click position is offset from the design reference click position toward a fully-closed position. A rate of increase in the control stroke is larger until the pedal stroke reaches the click stroke from zero, in order that when the pedal stroke reaches the click position, the control stroke becomes equal to the kick-down stroke. The rate of increase in the control stroke is smaller until the pedal stroke reaches the WOT stroke from the click stroke.

A vehicle C represents a vehicle in which the click position is offset from the design reference click position toward a fully-open position. The rate of increase in the control stroke is smaller until the pedal stroke reaches the click stroke from zero, in order that when the pedal stroke reaches the click position, the control stroke becomes equal to the kick-down stroke. The rate of increase in the control stroke is larger until the pedal stroke reaches the WOT stroke from the click stroke.

As described above, using the click stroke which differs from one vehicle to another and the kick-down stroke which is at a constant value in each vehicle, a gain is calculated by dividing the kick-down stroke by the click stroke, and the control stroke is calculated by multiplying the pedal stroke by the gain until the pedal stroke reaches the click stroke. For this reason, even though the click stroke differs from one vehicle to another, the control stroke is always equal to the click stroke when the pedal stroke reaches the click stroke (see FIG. 3).

Similarly, while the pedal stroke is in a range of the click stroke to the WOT stroke, an increase amount in the control stroke in relation to an increase amount in the pedal stroke can be determined by calculating the gain by dividing a subtraction of the click stroke from the WOT stroke by a subtraction of the control stroke from the WOT stroke.

The control stroke calculating means M3 applies the thus-calculated control stroke to the shift map 19. For this reason, when the control stroke exceeds the kick-down stroke, the shift controlling means M4 activates the shift actuator 20. Thereby, the kick-down of the automatic transmission is performed, and acceleration performance of the vehicle is enhanced.

Figure 4:
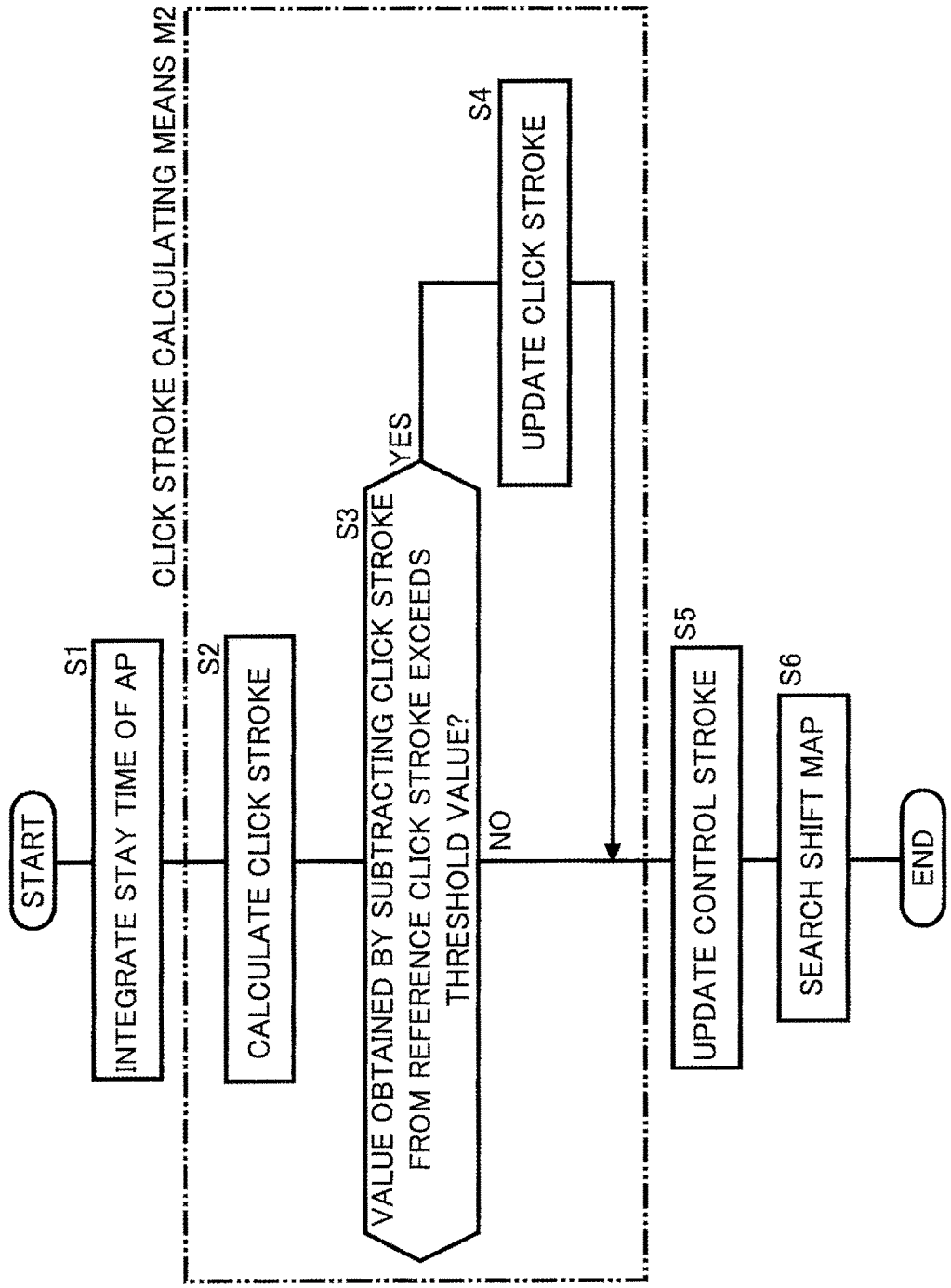
FIG. 4 is a flowchart showing an operation of the vehicle shift controller.
Figure 5:
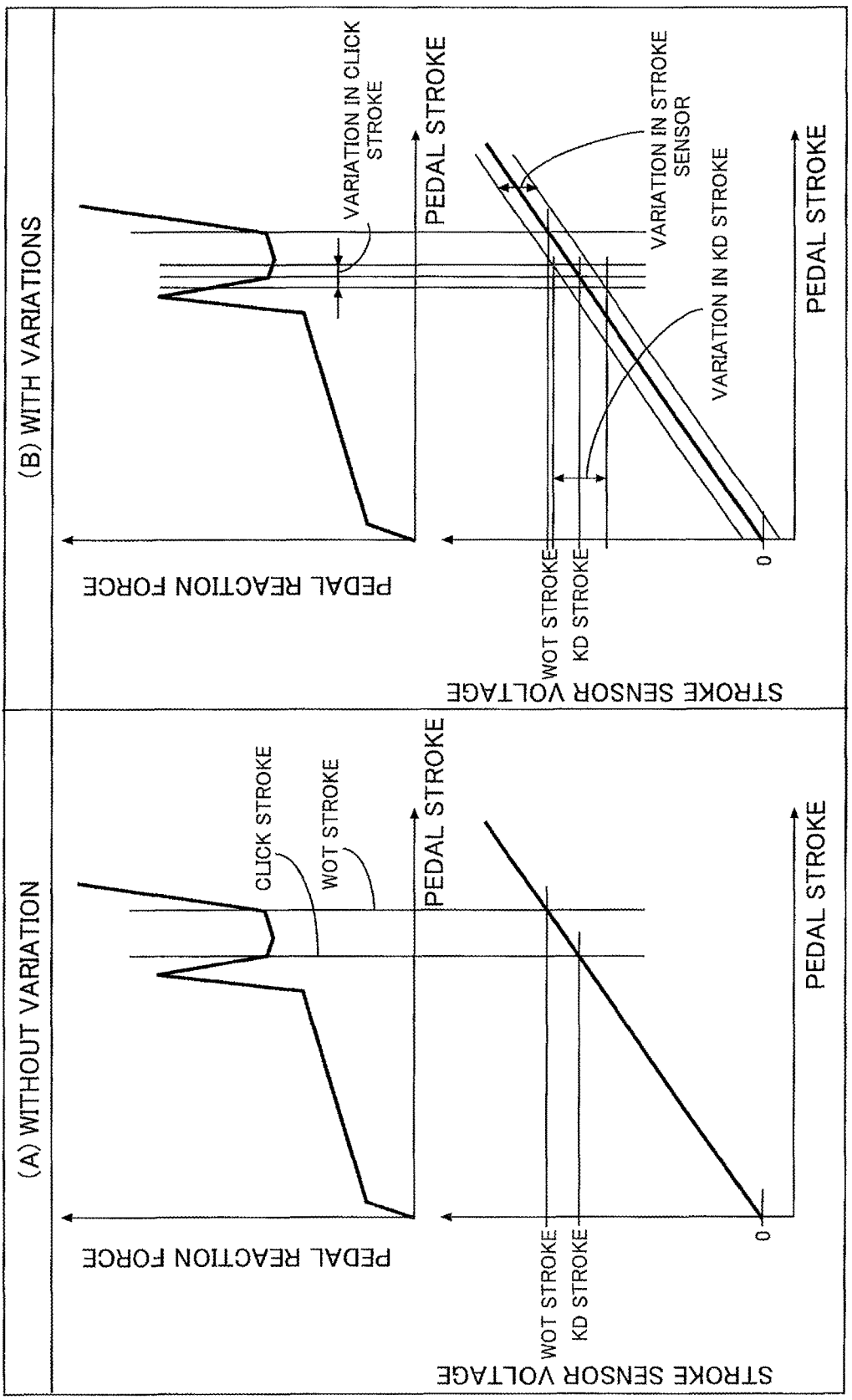
FIG. 5 is an explanatory view of problems with a conventional vehicle shift controller (Part 1)

Next, further descriptions will be provided for the foregoing operation on the basis of a flowchart of FIG. 4.

First of all, in step S1, the stay time integrating means M1 integrates the stay time of the accelerator pedal 11 in each pedal stroke position. Subsequently, in step S2, the click stroke calculating means M2 calculates the click stroke which is the pedal stroke at the time of depressing the accelerator pedal 11 beyond the click position. Thereafter, when, in step S3, a deviation between the reference click stroke which is the design click stroke (see FIG. 3) and the actual click stroke calculated by the click stroke calculating means M2 exceeds a threshold value, the click stroke calculating means M2 updates the reference click stroke with the actual click stroke in step S4.

Afterward, in step S5, on the basis of the thus-updated click stroke, the control stroke calculating means M3 updates the relationship of the control stroke with the pedal stroke, which has been shown in FIG. 3. Subsequently, in step S6, the shift map shown in FIG. 1 is referred to. If the control stroke searched for from the pedal stroke exceeds the kick-down stroke, it is judged that the accelerator pedal 11 is depressed beyond the click position, and the shift controlling means M4 performs the kick down of the automatic transmission.

According to the embodiment, as described above, the stay time integrating means M1 integrates the stay time of the accelerator pedal 11 in each pedal stroke position within the predetermined stroke range including the click position, and the click stroke calculating means M2 calculates the click stroke on the basis of the pedal stroke position where the stay time integrated by the stay time integrating means M1 is the shortest. Accordingly, even if there is variation in the click position of the accelerator pedal 11, it is possible to correctly calculate the click stroke with which the accelerator pedal 11 is actually depressed beyond the click position.

At this time, when the deviation between the pre-set reference click stroke and the click stroke exceeds the threshold value, the click stroke calculating means M2 updates the reference click stroke with the click stroke. For this reason, it is possible to avoid frequent updates.

In addition, in accordance with the click stroke, the control stroke calculating means M3 updates the relationship of the control stroke with the pedal stroke. For this reason, even if the click stroke varies from one vehicle to another, the kick-down which the driver intends can be performed in synchronism with the depression of the accelerator pedal 11 beyond the click position by compensating for the variation.

At this time, the control stroke calculating means M3 calculates the gain from the relationship between the click stroke and the kick-down stroke, and calculates the control stroke by multiplying the pedal stroke by the gain. For this reason, the control stroke can be calculated simply and accurately.

Furthermore, the kick-down stroke need not be set lower for the purpose of preventing an unexpected kick-down from being performed. For this reason, it is possible to sufficiently secure hysteresis for the upshift and the downshift by widening the intervals between the shift lines in the shift map, and accordingly to avoid deterioration in drivability. Moreover, since the click stroke can be calculated by only operating the accelerator pedal 11 by depression without actually making the vehicle travel, convenience is enhanced.

Although the foregoing descriptions have been provided for the embodiment of the present invention, various design changes may be made to the present invention within a scope not departing from the meaning of the present invention.

For example, in the embodiment, detection of the pedal stroke of the accelerator pedal 11 is performed by the stroke sensor 14 on the basis of the angle of rotation of the spindle 12. However, the detection is not limited to that thus performed.

Moreover, the structure of the click mechanism 15 is arbitrary, and is not limited to that described in the embodiment.

What is claimed is:

1. A vehicle shift controller comprising:
an accelerator pedal which a driver operates by depression;
a pedal reaction force click mechanism for giving a click feeling to pedal reaction force at a click position in a middle of a pedal stroke of the accelerator pedal;
a pedal stroke sensor for detecting the pedal stroke of the accelerator pedal; and
an electronic control unit configured to operate as:
a control stroke calculator for calculating a control stroke based on the pedal stroke;
a shift controller for performing kick-down of an automatic transmission when the control stroke exceeds a pre-set kick-down stroke;
a stay time integrator for integrating stay time of the accelerator pedal in each pedal stroke position within a predetermined stroke range including the click position; and
a click stroke calculator for calculating a click stroke based on a pedal stroke position corresponding to a shortest stay time integrated by the stay time integrator within the predetermined stroke range,
wherein the control stroke calculator updates a relationship of the control stroke with the pedal stroke in accordance with the calculated click stroke.

2. The vehicle shift controller according to claim 1, wherein the click stroke calculator updates a reference click stroke with the click stroke when a deviation between a pre-set reference click stroke and the click stroke exceeds a threshold value.

3. The vehicle shift controller according to claim 2, wherein the control stroke calculator calculates a gain from a relationship between the click stroke and the kick-down stroke, and calculates the control stroke by multiplying the pedal stroke by the gain.

4. The vehicle shift controller according to claim 1, wherein the control stroke calculator calculates a gain from a relationship between the click stroke and the kick-down stroke, and calculates the control stroke by multiplying the pedal stroke by the gain.

\* \* \* \* \*